United States Patent [19]

Inoue

[11] 4,283,118
[45] Aug. 11, 1981

[54] LIQUID CRYSTAL DISPLAY WITH A SUBSTRATE CARRYING DISPLAY ELECTRODES AND INTEGRATED CIRCUIT CHIP CONNECTED THERETO

[75] Inventor: Yukihiro Inoue, Kashihara, Japan

[73] Assignee: Sharp Kabushiki Kaisha, Osaka, Japan

[21] Appl. No.: 168,249

[22] Filed: Jul. 10, 1980

Related U.S. Application Data

[63] Continuation of Ser. No. 879,392, Feb. 21, 1978, abandoned.

[30] Foreign Application Priority Data

Feb. 22, 1977 [JP]  Japan .................................. 52-21659

[51] Int. Cl.$^3$ ............................................ G02F 1/133
[52] U.S. Cl. .................................... 350/334; 350/343; 357/71; 228/121; 228/263 R
[58] Field of Search .................. 350/334, 343; 357/71; 228/121, 208, 263

[56] References Cited

U.S. PATENT DOCUMENTS

| | | | |
|---|---|---|---|
| 3,928,658 | 12/1975 | van Bortel | 350/334 X |
| 4,106,860 | 8/1978 | Kaufmann | 350/343 |

FOREIGN PATENT DOCUMENTS 1381429  1/1975  United Kingdom ................... 350/343

*Primary Examiner*—Edward S. Bauer
*Attorney, Agent, or Firm*—Birch, Stewart, Kolasch & Birch

[57] ABSTRACT

A liquid crystal display includes a substrate carrying display electrodes and an integrated circuit chip connected thereto. The display electrodes are made of appropriate transparent material such as $InO_2$. Multiple soldering layers are provided on the extension of the display electrodes so that they are bonded with bumps formed on the integrated circuit chip by soldering technology. The multiple soldering layers are deposited by evaporation methods or sputtering techniques with a thickness of 3000 Å to 5000 Å. In a preferable form, the multiple soldering layers include three (3) layers made of Cr, Cr-Au alloy, Au, respectively. The multiple soldering layers may comprise two (2) layers made of Ni-Fe alloy and Au in another preferable form.

4 Claims, 3 Drawing Figures

LIQUID CRYSTAL DISPLAY WITH A SUBSTRATE CARRYING DISPLAY ELECTRODES AND INTEGRATED CIRCUIT CHIP CONNECTED THERETO

This application is a continuation of copending application Ser. No. 879,392, filed on Feb. 21, 1978 and now abandoned.

BACKGROUND OF THE INVENTION

The present invention relates to a liquid crystal display and, more particularly, to a liquid crystal display with a substrate carrying display electrodes and an integrated circuit chip connected thereto.

Recently, some liquid crystal displays have been proposed, which include a substrate carrying display electrodes and an integrated circuit chip. However, the display electrodes are not involved in achieving bonding with the integrated circuit chip. Therefore, it is necessary to make another electrode for the integrated circuit in prior art liquid crystal displays. Thus, an additional fabrication step is required for the another electrode which complicates the fabrication steps.

OBJECTS AND SUMMARY OF THE INVENTION

With the foregoing in mind, it is a primary object of the present invention to provide a novel liquid crystal display with a substrate carrying display electrodes and an integrated circuit chip connected thereto.

Another object of the present invention is to provide a novel liquid crystal display with a substrate carrying display electrodes and an integrated circuit chip connected thereto with a reduction in the number of fablication steps therefor.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, multiple solder layers to be connected to a specific display electrode are provided for ensuring physical contacts between bumps disposed on the semiconductor chip. A transparent, conductive film such as $InO_2$ which is utilized for a display electrode of a liquid crystal display is arranged on a glass substrate therefor. The transparent, conductive film is formed in a desirable pattern by evaporation techniques. The multiple soldering layers are fabricated on the transparent, conductive film by evaporation techniques or sputtering methods. In a preferred form, the multiple soldering layers comprise three (3) metallic layers made of Cr, Cr-Au alloy, and Au in the named order, respectively.

BRIEF DESCRIPTION OF THE DRAWINGS

Other objects and novel features of the present invention are set forth in the appended claims and the present invention as to its organization and its mode of operation will best be understood from a consideration of the following detailed description of the preferred embodiments taken in connection with the accompanying drawings, wherein:

DETAILED DESCRIPTION OF THE PREFERRED EMBODIMENTS

Figure 1:
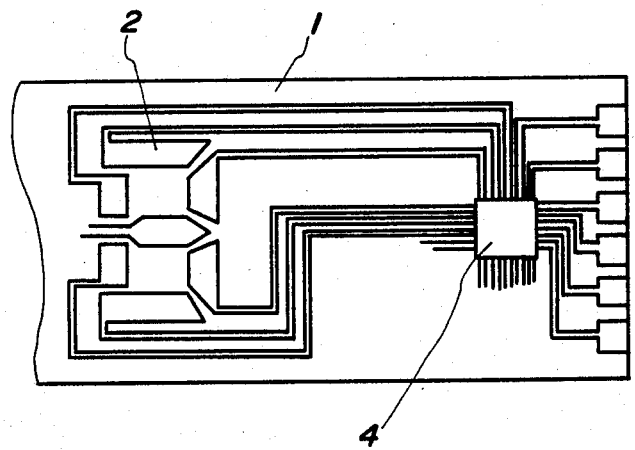
FIG. 1 is a plan view of a liquid crystal display with a substrate carrying display electrodes and an integrated circuit chip connected thereto according to the present invention.

FIG. 1 is a plan view of a flip chip arrangement for semiconductor bonding according to the present invention. A glass substrate 1 is provided for supporting a liquid crystal display and a semiconductor chip 4, for example, a complementary MOS. A transparent, conductive film 2 such as $InO_2$ is arranged so as to provide a display electrode for the liquid crystal display, for example, by means of segment patterns thereof. The transparent, conductive film 2 is extended beyond a display area of the liquid crystal display to thereby provide terminals for the semiconductor chip 4. The transparent, conductive film 2 is further arranged to make contacts with other elements such as a power battery and key switches (not shown).

Figure 2:
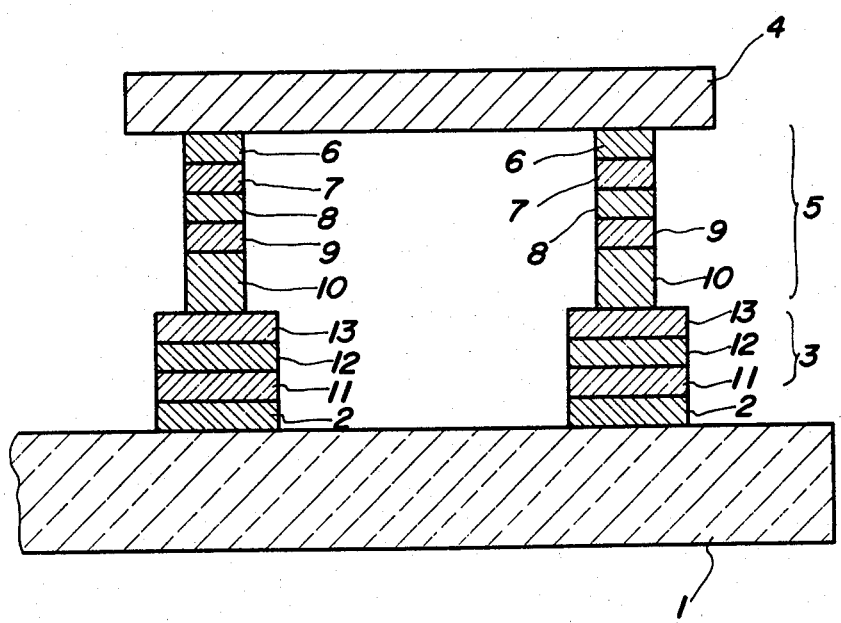
FIG. 2 is a cross sectional view of the integrated circuit chip and multiple soldering layers formed on the substrate shown in FIG. 1, wherein a display portion is omitted for convenience sake only.

Attention is directed to FIG. 2, wherein the glass substrate 1, the semiconductor chip 4, a bump 5, and multiple solder layers 3 are shown in a cross sectional view. The display area of the liquid crystal display is omitted from FIG. 2 for convenience sake only.

The bump 5 comprises five (5) layers 6, 7, 8, 9 and 10 made of Cr, Cu, Au, Cu, and Pb/Sn, respectively, as an example. The three (3) layers 6, 7, and 8 made of Cr, Cu, and Au, respectively, have a thickness of 3000 Å to 8000 Å. The two (2) layers made of Cu and Pb/Sn are several ten $(10)\mu$ in thickness.

These layers are provided by conventional evaporation methods. A suitable number of the bumps 5 are formed on the semiconductor chip 4.

Multiple soldering layers 3 are formed on the transparent, conductive film 2 so as to facilitate bonding with the bump 5 by soldering technology. The multiple soldering layers 3 include three (3) layers 11, 12, and 13 made of Cr, Cr-Au alloy, and Au, respectively in a preferable form. These multiple soldering layers 3 are disposed by evaporation techniques or sputtering methods. The Cr-Au alloy layer 12 is fabricated by simultaneous evaporation of Cr and Au or evaporation after mixing of Cr and Au. The thickness of the multiple soldering layers 3 is 3000 Å to 5000 Å.

The Cr layer 11 shows good adhesion with the transparent, conductive film 2. The Au layer 13 has strong soldering adhesion with the bump 5 and has also good chemical stability, namely, good resistance against oxidation.

In another embodiment of the present invention, the multiple soldering layers 3 comprise two (2) layers made of Ni-Fe alloy and Au, respectively. The multiple soldering layers 3 have a thickness of 3000 Å to 5000 Å which is fabricated by evaporation techniques or sputtering methods. The Ni layer shows good adhesion with the transparent, conductive film 2.

Figure 3:
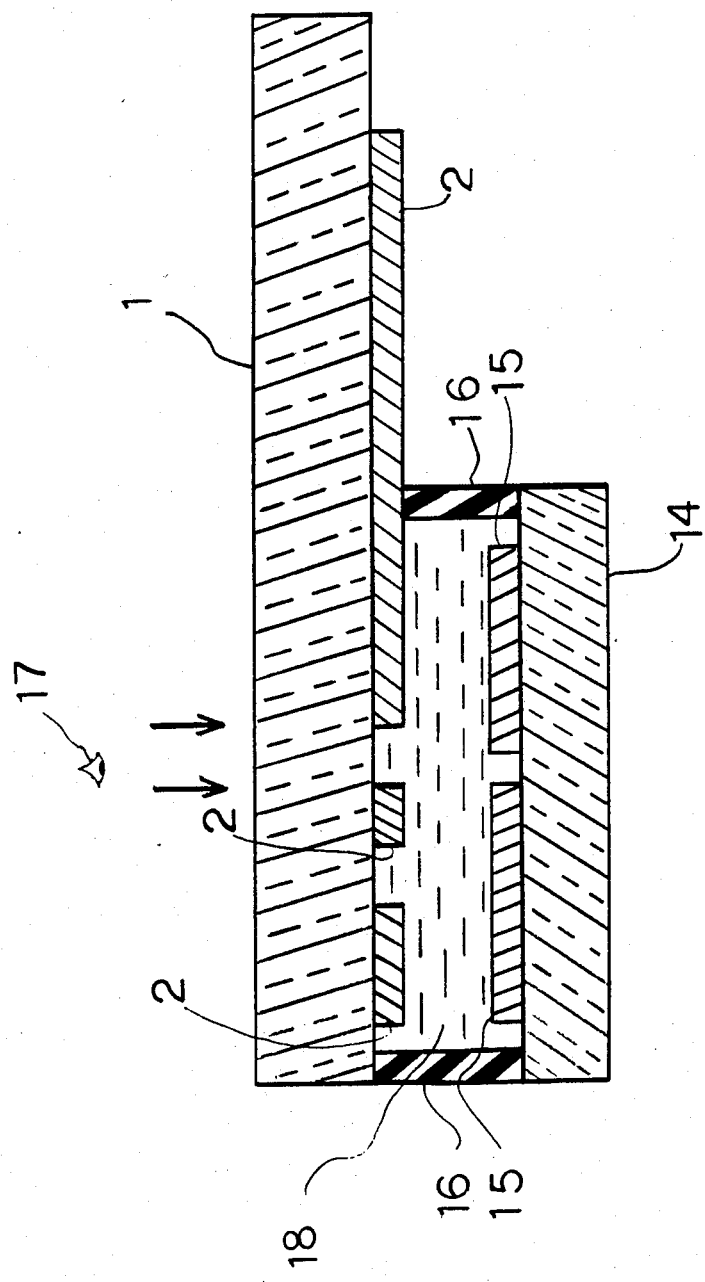
FIG. 3 is a cross sectional view of the liquid crystal display according to the present invention, wherein the integrated circuit chip and the multiple soldering layers are omitted for convenience sake only.

FIG. 3 illustrates the liquid crystal display of the present invention, wherein the semiconductor chip 4, the bump 5, and the multiple soldering layers 3 are omitted for convenience sake only.

The liquid crystal display comprises the glass substrate 1, the transparent, conductive film 2, thereon a glass plate 14, common electrodes 15 thereon, and seal means 16. Suitable liquid crystal material 18 is filled between the glass substrate 1, the glass plate 14, and the seal means 16. In a preferred example, the liquid crystal material 18 comprises a nematic liquid crystal composition which exhibits the dynamic scattering effects upon subjecting a thin film of the composition to an electrical potential. A viewer 17 observes the liquid crystal display through the glass substrate 1.

In accordance with the present invention, an extra step is eliminated, the extra step being that of fabricating the electrodes for the semiconductor chip 4 after manufacturing the liquid crystal display. The transparent, conductive film 2 can be provided in only one configuration thereof for forming the display electrode of the liquid crystal display and the electrodes for the semiconductor chip 4.

While only certain embodiments of the present invention have been described, it will be apparent to those skilled in the art that various changes and modifications may be made therein without departing from the spirit and scope of the invention as claimed.

What is claimed is:
1. A liquid crystal display comprising:
   a glass substrate;
   a liquid crystal display formed on the glass substrate;
   a display electrode film provided for the liquid crystal display;
   multiple soldering layers formed on an extension of the display electrode film, said layers including Cr, Cr-Au alloy, and Au seriatum beginning at said display electrode film;
   an integrated circuit chip; and
   bump means disposed on the integrated circuit chip, the bump means being bonded with the Au layer of said multiple soldering layers.
2. The liquid crystal display as recited in claim 1, wherein the display electrode is transparent, conductive film made of $InO_2$.
3. The liquid crystal display as recited in claim 1, wherein the thickness of the multiple soldering layers is 3000 Å to 5000 Å.
4. The liquid crystal display as recited in claims 1, 9 or 10 wherein said bump means includes multiple layers, the layer of said bump means adjacent the furthest of said soldering layers from said display electrode film comprising Pb/Sn.

* * * * *